US008725605B1

(12) United States Patent
Plunkett

(10) Patent No.: US 8,725,605 B1
(45) Date of Patent: May 13, 2014

(54) METHOD AND SYSTEM FOR MANAGING SERVICE ACCOUNTS

(75) Inventor: John M. Plunkett, Bumpass, VA (US)

(73) Assignee: Capital One Financial Corporation, Glen Allen, VA (US)

(*) Notice: Subject to any disclaimer, the term of this patent is extended or adjusted under 35 U.S.C. 154(b) by 1796 days.

(21) Appl. No.: 09/685,335

(22) Filed: Oct. 11, 2000

(51) Int. Cl.
G06Q 40/00 (2012.01)

(52) U.S. Cl.
USPC .................... 705/35; 705/38; 705/40

(58) Field of Classification Search
USPC .......... 235/379, 492; 705/40, 36 R, 35, 38, 39
See application file for complete search history.

(56) References Cited

U.S. PATENT DOCUMENTS

| | | | |
|---|---|---|---|
| 5,864,830 A | | 1/1999 | Armetta et al. |
| 5,920,847 A | * | 7/1999 | Kolling et al. ............ 705/40 |
| 5,940,809 A | * | 8/1999 | Musmanno et al. ........ 705/35 |
| 5,956,024 A | | 9/1999 | Strickland et al. |
| 6,041,315 A | * | 3/2000 | Pollin ....................... 705/45 |
| 6,044,362 A | | 3/2000 | Neely |
| 6,058,375 A | | 5/2000 | Park |
| 6,064,990 A | * | 5/2000 | Goldsmith ................. 705/75 |
| 6,072,870 A | | 6/2000 | Nguyen et al. |
| 6,076,072 A | | 6/2000 | Libman |
| 6,408,284 B1 | * | 6/2002 | Hilt et al. .................. 705/40 |

OTHER PUBLICATIONS

Welcome to Yodlee, (visited Jul. 20, 2000).
Nelson, Stephen, "Quicken 99 for Windows for Dummies," IDG Books, 1998, pp. 99-11, 297-300.

* cited by examiner

Primary Examiner — Ojo Oyebisi
(74) Attorney, Agent, or Firm — Hunton & Williams LLP

(57) ABSTRACT

Systems consistent with the present invention provide financial account management services for user service accounts. Such systems receive requests from users to register with a trusted intermediary. Registration with the intermediary enable users to customize management services to be performed for selected user service accounts. The trusted intermediary server periodically collects account information from provider servers that govern accounts provided to the users. The intermediary server then analyzes the collected account information to determine whether customized management services should be performed. The management services may include sending account status messages to the users and performing automatic payment functions to credit delinquent accounts. Such methods and systems enable users to avoid, for example, penalties and fees associated with mis-managed accounts by allowing the intermediary server to perform proxy management services for users.

26 Claims, 6 Drawing Sheets

| ACCOUNT PROVIDER | ACCOUNT NUMBER | USER ID | PASS-WORD | TRIGGER RULE FLAG |
|---|---|---|---|---|
| CAPITAL ONE | 0123-4567 8901-234 | JEP101 | CAP1-1999 | 01101101 |
| FIRST UNION | 5678-8901 2345-6789 | USERA | MOUNTAIN 1222 | 11001011 |
| NEXTCARD | 0012-3455 6677-8899 | G2313 | TREE222 | 1100001 |
| E*TRADE | 1122-3333 4444-5555 | WDD39 | MONEY4 ME | 0000000 |
| BANKOFAMERICA | 6789-0123 4455-6677 | GFT300 | FRUIT123 | 0111001 |

FIGURE 4

METHOD AND SYSTEM FOR MANAGING SERVICE ACCOUNTS

BACKGROUND OF THE INVENTION

I. Field of the Invention

The present invention relates to managing financial services and, more particularly, to methods and systems for managing service accounts for users.

II. Description of the Related Art

Financial account management has become an increasingly important role for the average consumer. The increase in the popularity of financial services, such as credit cards, automatic debit payment processes, customized checking, savings and investment accounts, coupled with the onset of the Internet and electronic commerce, have forced the average consumer to become personal financial managers for a plurality of types of personal accounts. These services give consumers the versatility and financial freedom to control their assets and credit. However, along with this freedom, comes the disadvantage of managing a wide range of financial accounts in order to ensure payments are not late, balances are not exceeded and purchases/investments are legitimate.

In addition, consumers with a plurality of different accounts, such as a number of various credit cards, may have trouble keeping current with account balances, payments and other transactions. The consequences of mis-management may result in penalties assessed by the institutions providing the accounts. These penalties may be associated with payments that were not made on time or balance thresholds that are exceeded.

In order to help consumers manage different accounts, on-line account management services have been created. These services allow consumers to enroll with a financial service that collects account information for the consumer. Consumers enroll by giving the financial service secure account information associated with the accounts the consumers wish to have monitored. These services act as a trusted intermediary by accessing servers provided by the institutions governing the accounts associated with the consumers. The trusted intermediary collects account information from institution servers and combines the information into an aggregated document reflecting balance information associated with accounts the consumers selected to have monitored. The document is then sent to the consumers for display through, for example, a browser application running at a client site where the consumer is located.

Other conventional account management services enable consumers to be notified when transactions have taken place on their accounts. These services, which may be provided by a financial institution governing the consumer's accounts, send a message to the consumer after account activity has been detected. Thus, consumers are alerted whenever a transaction takes place with a given account, enabling them to authenticate and track the transactions.

Although conventional account management services allow consumers to obtain account balance and transaction information, they do not provide consumers with automatic protection from the penalties associated with mismanaged accounts. There is therefore a need for a system that provides consumers with automatic account monitoring services that perform customized management operations for consumer accounts to reduce, or eliminate, the incurrence of penalties from account institution providers.

SUMMARY OF THE INVENTION

Methods, systems, and articles of manufacture consistent with the present invention overcome the shortcomings of existing systems by performing consumer selected services on selected consumer accounts, based on trigger conditions set by the consumer. Such methods, systems, and articles of manufacture receive requests from consumers to register with a trusted intermediary. The requests include privileged token information associated with each consumers' account. The methods, systems, and articles of manufacture consistent with the present invention then enable consumers to select customized trigger conditions and associated management services correlated with each registered account. Account information is then collected from servers controlled by the institutions providing the consumers' accounts. The collected account information is then analyzed against the consumers' selected trigger conditions to determine whether the selected management services for each account need to be implemented.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings:

FIG. 4 illustrates a user account table stored in the trusted intermediary, in a manner consistent with the principle of the present invention.

DETAILED DESCRIPTION

Figure 1A:
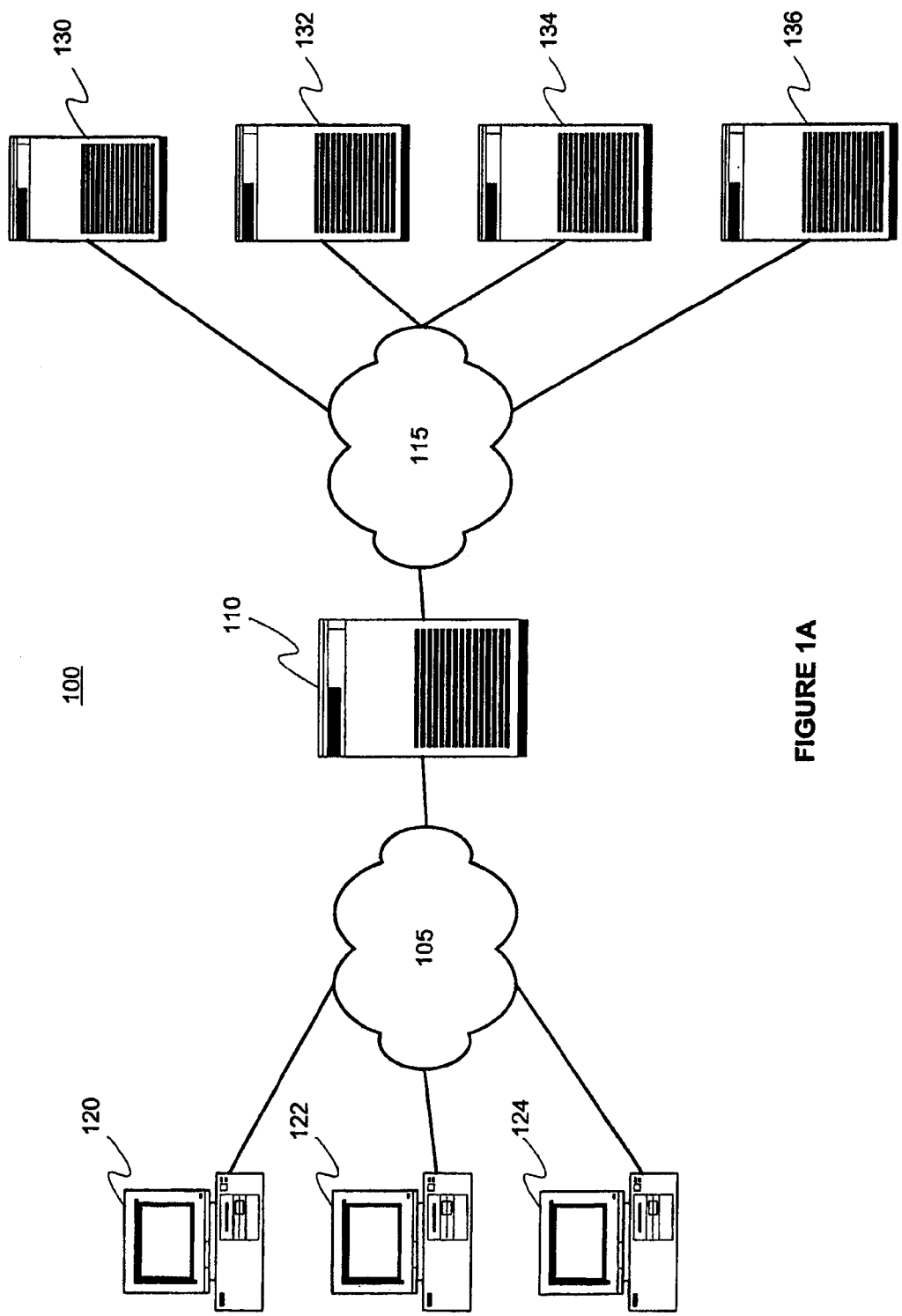
FIGS. 1A and 1B are block diagrams of exemplary computer networks, in which systems consistent with the present invention may be implemented.

Reference will now be made in detail to implementations consistent with the present invention, as illustrated in the accompanying drawings. Wherever possible, the same reference numbers will be used throughout the drawings and the following description to refer to the same or like parts.

Systems and methods consistent with the present invention enable consumers to register with a trusted intermediary, allowing it to manage accounts associated with the consumers. The trusted intermediary receives account token information from the consumers, and creates account tables including the token information for each consumer. The token information is privileged account information correlated with each consumer that authorizes the trusted intermediary to access secure account information maintained account provider servers associated with each user service account. For example, the token information may include account numbers, consumer identification numbers, account passwords, account provider identification information, and any other type of information needed by the trusted intermediary to establish an authorized connection to the account provider's server.

Accounts are business relationships established with institutions that provide services or products for financial transactions. For example, accounts may be financial accounts associated with institutions that provide credit cards, savings or checking accounts, investment services, or any other type of financial account that enable consumers to obtain or invest monetary funds. Accounts may also be service accounts associated with residential services such as electricity, natural gas, telephone, cable or satellite television, or any other type of service account associated with services governed by providers that bill consumers for usage of those services. Accounts may also be property accounts such as mortgage, lease and vehicle accounts, or any other type of property account associated with property provided or financed by providers.

Systems consistent with the present invention enable registered consumers to define trigger conditions and associated management services for registered accounts with the trusted intermediary. Trigger conditions are conditions associated with each account, based on attributes of the accounts, such as balance or transaction information. Trigger conditions are considered set when the attributes associated with an account meet criteria defined by the trigger condition. For example, a trigger condition associated with a balance attribute may be based on a predetermined maximum account balance set by the provider of the account. A trigger condition with this type of attribute may be set when the account balance is determined to be near a predetermined range of the maximum value. In one embodiment of the present invention, consumers may define the range values for each account. The attributes may also be associated with payment date information. For example, attributes of this type may reflect information on when a payment is due from the consumer to the account provider, and trigger conditions associated with these attributes may be set when an account provider has not received payment from a consumer by a certain date. As can be seen, a plurality of trigger conditions may be selected by registered consumers in order to customize the account management services provided by the trusted intermediary.

Account management services are services performed by the trusted intermediary when a trigger condition is detected. Various services may be performed based upon the type of trigger condition and account. For example, one type of management service may be sending messages to consumers regarding the status of the account associated with the detected trigger condition. Other types of management services may be performing automatic payments to providers of the consumers' accounts.

Methods and systems consistent with the present invention enable consumers to select from a plurality of account management services to be rendered by the trusted intermediary, based on the type of trigger conditions set for each registered account. Consequently, consumers may avoid paying penalty fees associated with late payments and over the limit balances by customizing the rules and services performed by the trusted intermediary for each consumer account.

FIG. 1A illustrates a block diagram of a computer network 100, consistent with principles of the present invention. Computer network 100 comprises small computers (such as client computers 120, 122 and 124) and large computers (such as servers 110, 130, 132, 134 and 136). In general, small computers are "personal computers" or workstations and are the sites at which a human user operates the computer to make requests for data from other computers or servers on the network. Usually, the requested data resides in large computers. In this scenario, small computers are clients and the large computers are servers.

The terms "client" and "server" are used herein to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 120, may request information from server 110. Since computer 120 is not directly connected to server 110, for example, network 105 interconnects server 110 to computers 120, 122 and 124, the requested information must first travel from server 110, through network 105 and then to computer 120. The network 105 of FIG. 1A represents, for example, the Internet, which is an interconnection of networks. A different request from computer 122 may be for a file that resides in server 130. In this case, the data is transferred from server 130 to server 110 through network 115, and, finally, from server 110 to computer 122 through network 105. The network 115 of FIG. 1A represents, for example, the Internet, which is an interconnection of networks. The distance between servers 110 and 130, and between and client 122 and server 110 may be very long, e.g. across continents, or very short, e.g., within the same city. Further, in traversing the network the data may be transferred through several intermediate servers and many routing devices, such as bridges and routers.

Systems consistent with the present invention employ server 110 as a trusted intermediary server and servers 130, 132, 134 and 136 as service providers. Trusted intermediary server 110 is maintained by a trusted intermediary that performs the management functions described herein. Computers 120, 122 and 123 are client computers as previously described. Although FIG. 1A shows only three client computers and four provider servers, the principles of the present invention contemplate many such servers and client computers.

Service provider servers 130, 132, 134 and 136 are servers controlled by service providers and govern the financial processing related to the services rendered by the providers. The financial processing may be related to the server side management of user accounts, such as maintaining the balance and billing status of user accounts associated with users that utilize the services rendered by the providers.

Providers may be, for example, financial institutions such as Capital One, First Union, E*Trade and Bank of America, that provide financial services (i.e. credit cards, loans, checking or investment accounts) from which a user of these services may be charged fees for. Providers may also be institutions that provide services associated with utilities or entertainment such as utility, cable television and telephone companies, for example. In short, providers may be associated with any type of service that is rendered to a user, from which the user may be charged fees for use of the service.

Trusted intermediary server 110 is a server that interfaces with the service provider servers 130, 132, 134 and 136 to perform account management operations for users located at one of the client computers 120, 122 and 124. Trusted intermediary server 110 provides a secure connection to the service provider servers through network 115, using secure information provided by the users.

Figure 1B:
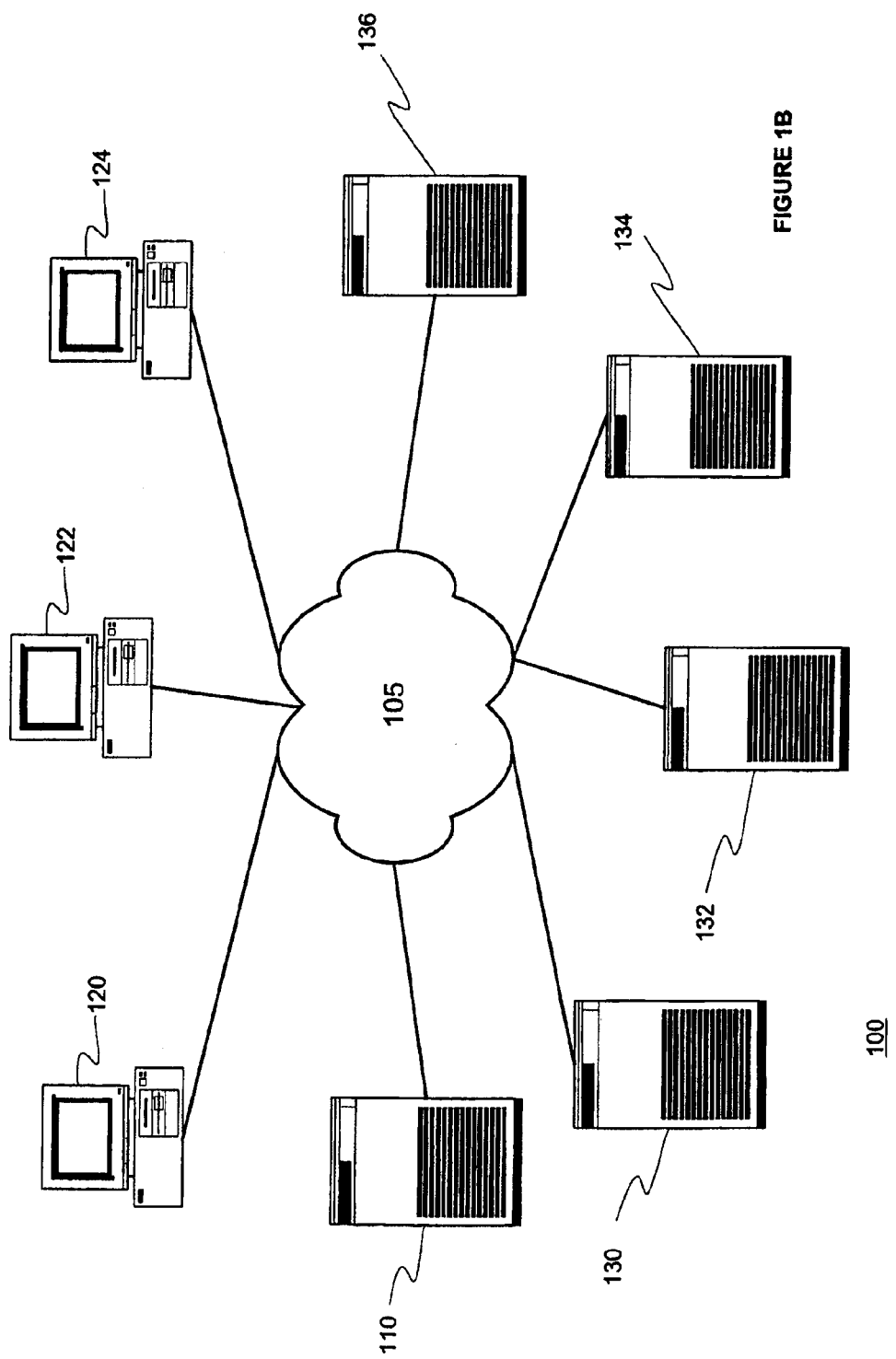

The secure connection between trusted intermediary server 110 and service provider servers 130, 132, 134 and 136 may be implemented in various ways. FIG. 1B illustrates a block diagram of an exemplary network 100, consistent with an alternate configuration of the present invention. Elements 105, 110, 120, 122, 124, 130, 132, 134 and 136 represent the same elements as described for FIG. 1A, except in FIG. 1B, network 105 commonly interconnects elements 110 through 136. As in FIG. 1A, network 105 illustrates, for example, the Internet, which is an interconnection of networks.

Figure 2:
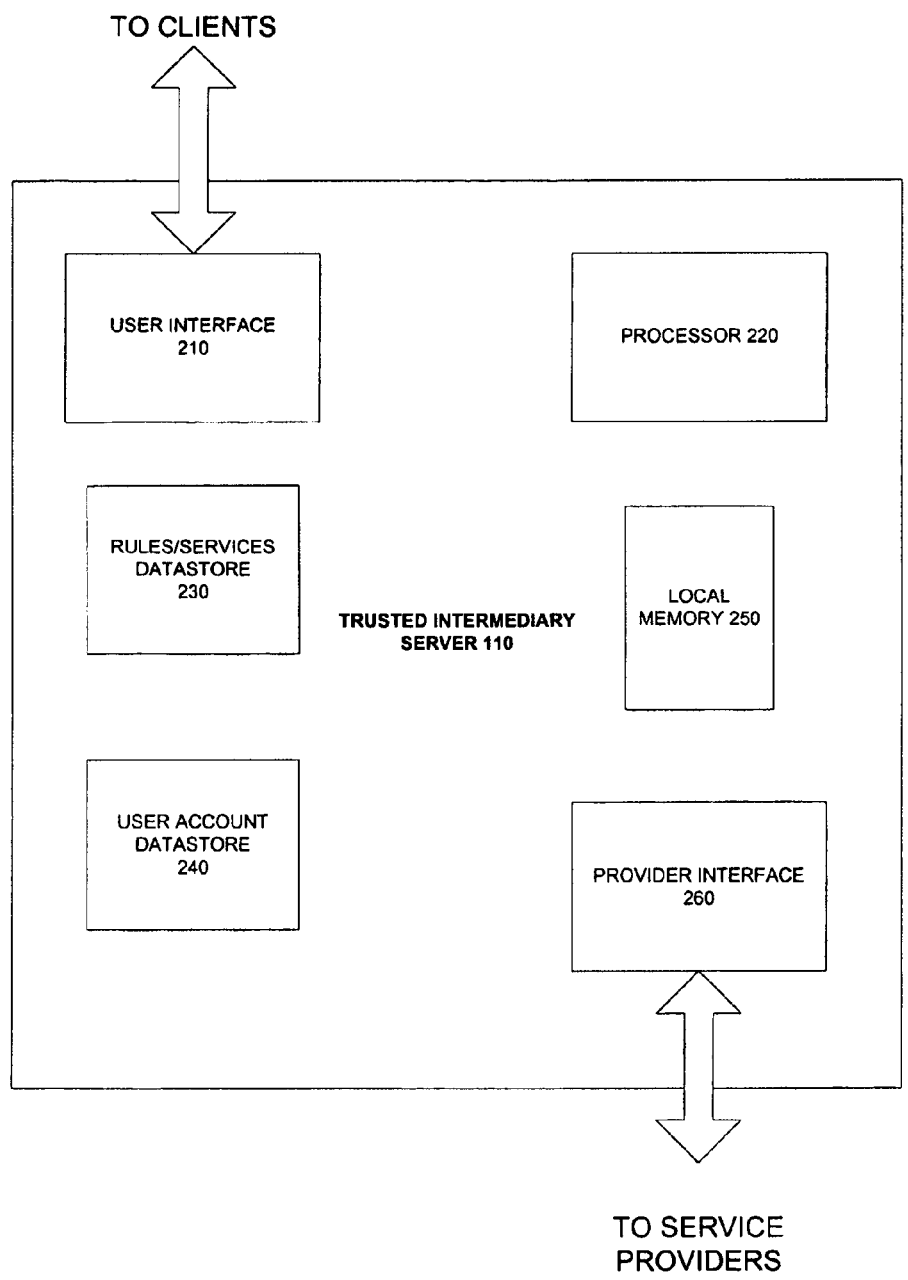
FIG. 2 is a block diagram of the architecture of a trusted intermediary server, in a manner consistent with the principle of the present invention.

FIG. 2 shows exemplary components operating within trusted intermediary server 110. Trusted Intermediary server 110 includes a user interface 210, processor 220, rules/services data store 230, local memory 250, user account data store 240 and provider interface 260. In alternate embodiments of the invention, a trusted intermediary server may comprise of additional dedicated processors, in place of processor 220, that perform dedicated operations associated with management functions. The operation of each of the components illustrated in FIG. 2 will be explained below with reference to FIG. 5.

Figure 3:
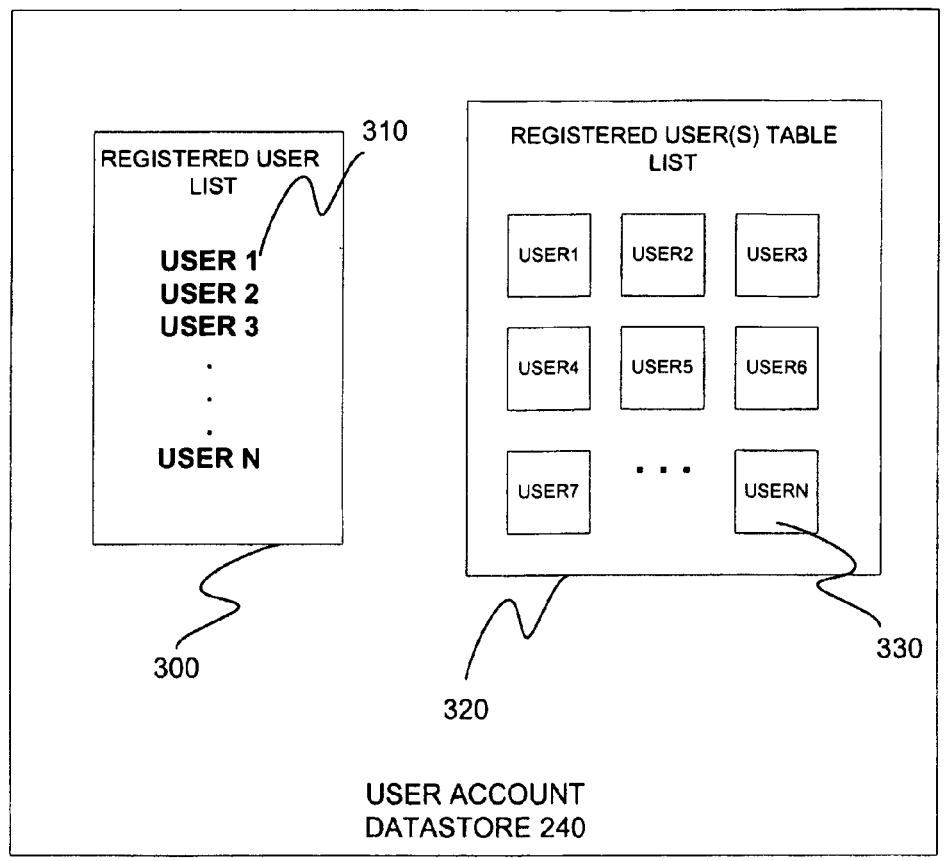
FIG. 3 is a block diagram of a data store stored in the trusted intermediary, in a manner consistent with the principle of the present invention.

FIG. 3 is an exemplary block diagram of user account data store 240. User account data store 240 includes a registered user list 300 and registered user(s) tables list 320. User list 300 includes a list of users 310, that have registered with the trusted intermediary, and list 320 includes a plurality of user tables 330 each associated with a registered user 310 in stored in list 300. Also included in user account data store 240 is a user account update table (not shown) that houses current account balance and recent transaction information for each registered user listed in user list 300. Detailed description of the operation of these lists and tables will be further described with reference to FIG. 5.

FIG. 4 illustrates an example of a user table 330 stored in list 320. As shown in FIG. 4, user table 330 include a plurality of token information associated with individual accounts for each registered user 310. As part of this token information, user table 330 may include account provider data 402, account number data 404, user identification data 406, password data 408 for each account. User table 330 may also include trigger rule flag 410 for each individual account. As will be apparent, user table 330 may include a variety of types of privileged information associated with different accounts for each registered user 310, and is not limited to the information listed above. For example, user table 330 may also include additional security information such as secondary passwords, or authentication information such as social security numbers or maiden names. The token information stored in user tables 330 allow the trusted intermediary server to access account information stored in each service provider server 130, 132, 134 and 136 for the registered users 310. Detailed description of the implementation of this information will be further described with reference to FIG. 5.

Figure 5:
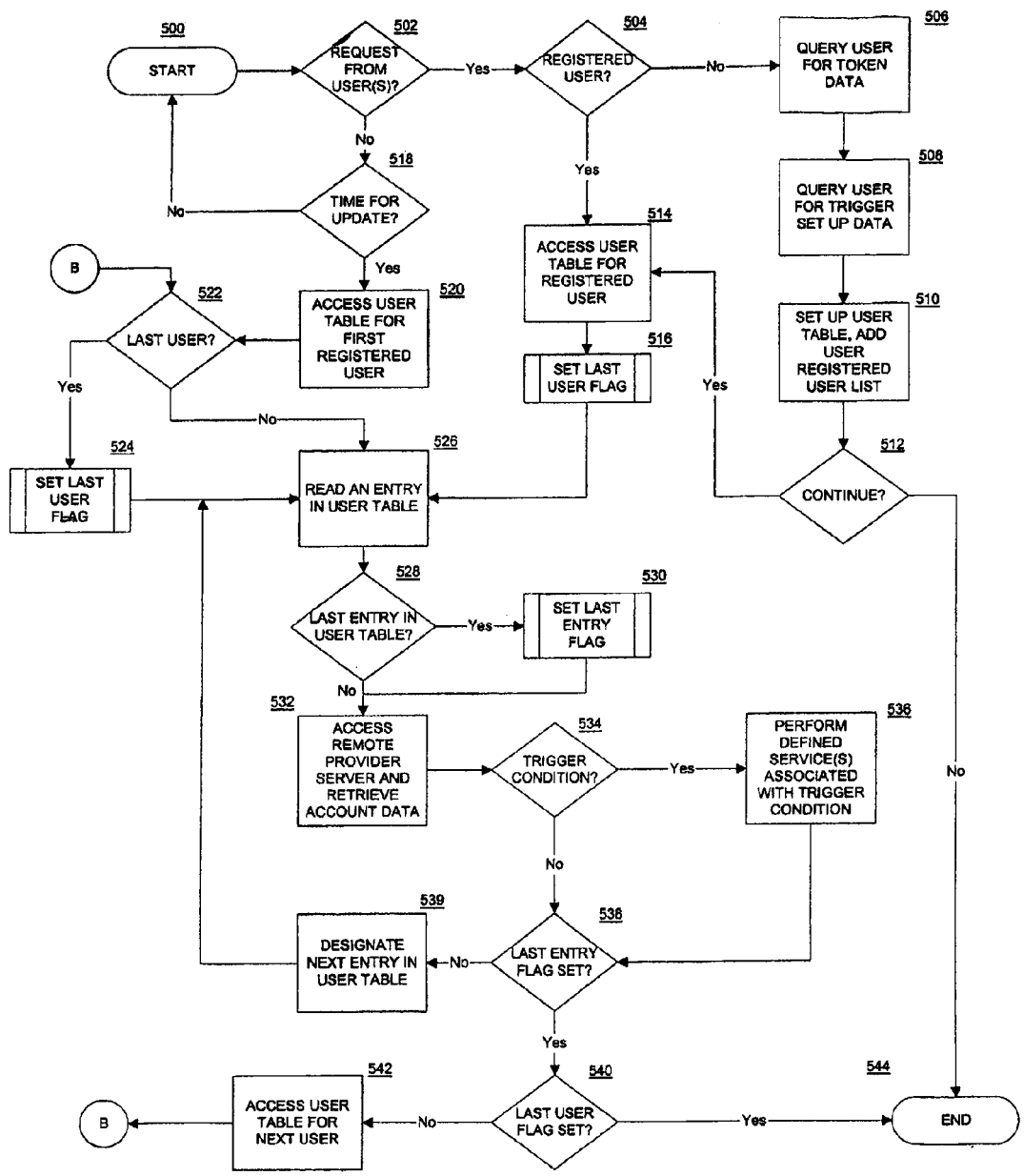
FIG. 5 is a flow chart of the steps performed by the trusted intermediary, in a manner consistent with the principle of the present invention.

FIG. 5 is an exemplary flow chart of the operations performed by trusted intermediary server 110, in accordance with an embodiment of the invention. Operations start at step 500, and proceed to step 502 to determine whether a request is received at user interface 210 from a user located at one of the client computers 120, 122 and 124. If a request from a user is received (Step 502; Yes), user interface 210 forwards the request to processor 220, where the request is analyzed to determine whether the user initiating the request has registered with the trusted intermediary server 110, as shown in step 504. This analysis may be performed by querying the user for user registration identification data and comparing the identification data against the registration list 300. Only registered users 310 are stored in list 300, thus if a request initiates from a user not found in list 300, the user is considered not registered with server 110. A plurality of authentication and authorization methods may be implemented to ensure a user attempting to access the trusted intermediary server 110 is an authorized registered user 310. If the user initiating the request is not considered a registered user (Step 504; No), the option for registering with server 110 may be provided at step 506.

Registration and Trigger Set Up Procedures

As part of the registration process, the user is queried at step 506 by trusted intermediary server 110 for privileged token information associated with accounts the user has with service providers. The token information requested by trusted intermediary server 110 may include secure account identification and access data that will enable server 110 to locate the service provider's associated server, access the user's account information, and perform proxy management functions with the provider's server on behalf of the user. The token information may include, but is not limited to, account provider names 402, account numbers 404, on-line login identification 406, password data 408 and address information (i.e. domain names, uniform resource locators) that enable the trusted intermediary server 110 to locate the service providers' servers, for example, on a network. Once the user has completed sending the token information, trusted intermediary server 110 queries the user for trigger set up data at step 508.

The information exchanged between the trusted intermediary server and the client and provider nodes may be secured using well known data transmission security techniques, including encryption and decryption operations. A plurality of security implementations may be utilized by the present invention to secure the transfer of information between nodes in FIGS. 1 and 1A. Under these implementations, it is known that the trusted intermediary server would be compatible with the security techniques utilized by the client and provider nodes.

Trigger set up data is associated with conditions that the user may correlate with each account, such that when the conditions are met, user selected management services may be performed automatically by trusted intermediary server 110. Processor 220 accesses rules/services data store 230 to collect a predefined set of rules and services that the user may select from when setting up trigger conditions for each account. The collected set of rules and services is sent to the client node 120, 122 and 124 where the user is located, via user interface 210. A browser application, executing at the client site may present set up options to the user in the form of rules. In one embodiment of the invention, the collected set up rules may be associated with "IF"/"THEN" operations, such as:

Rule 1:
IF the balance of an account is X dollars from the account's balance limit
THEN perform management service A; and
Rule 2:
IF the current date is within Y days of the due date of an account's bill payment, AND no payment has been sent within Z days, THEN perform management service B.
management service A—Send Email message to user reflecting the status of account AB.
management service B—Send Email, page and voicemail messages to user reflecting status of account AB.

Management services are actions performed by trusted intermediary server 110 when a trigger condition is set based upon the rules defined by the user. For example, the trigger condition of Rule 1 is associated with the balance of an account being within a predetermined range of the maximum limit, and management service A is performed based on the detection of the trigger condition. Management services may be selected according to the user's management needs for each account. These services may include, but are not limited to, sending messages to the user reporting the status of the account that set the trigger condition, requesting account blockage, and automatic payments credited to the user's account at the provider's server.

The messaging services performed by intermediary server 110 may include, but are not limited to, sending electronic mail messages to a predefined electronic mail address designated by the registered user, sending pager messages to a predefined pager number set by the registered user and sending automated voice messages to a registered user's telephone number. Message services may be set up such that one or all of the user's communication devices are sent messages, such as a broadcast message delivery to all designated user devices. The messages sent by trusted intermediary server 110 may be standard messages provided by server 110, or may be customized by the user during the set up operations.

The various communication paths needed to send the messages to the user are based on the type of messages to be sent. For example, sending electronic mail messages may utilize well known mail protocols such as Simple Mail Transfer Protocol (SMTP), while voice and pager messages would be sent using an established telecommunications path. In the case of a telecommunications path, client nodes 120, 122 and 124 may include telecommunication devices compatible with these types of communication protocols.

Messages may be prioritized according to the severity of the trigger condition. A user may set up a plurality of similar rules associated with varying trigger conditions, and perform various services based upon each level of the set trigger condition. For example, a user may define rules similar to Rule 1, with "X" varying for each rule, and the management service performed varying the closer "X" approaches the balance limit, such as:

Rule 3:
IF the balance of account AB is 500 dollars from the account's balance limit
THEN perform management service A;
Rule 4:
If the balance of account AB is 100 dollars from the account's balance limit
THEN perform management service B; and
Rule 5:
If the balance of account AB is 50 dollars from the account's balance limit
THEN perform management service C.
   management service A—Send Email message to user reflecting the status of account AB.
   management service B—Send Email, page and voicemail messages to user reflecting status of account AB.
   management service C—Send Email, page and voicemail messages to user reflecting status of account AB, and send voicemail message to a third party designated by the user.

As described, users may customize the types of message services they need performed, based upon the severity of the trigger condition in each rule. Management service C describes another form of message service, where the user may select a third party number to be notified.

Account blocking services may also be set up by the user to prevent the account from being used by unauthorized parties. A user may select rules that include trigger conditions that are profiled against unauthorized use of an specific account, and management services that allow trusted intermediary server 110 to send requests via provider interface 260, to the account provider's server to block future use of the account. For example, a user who knows they will not be using a credit card account for a certain period of time, may set up a rule as:

Rule 6:
IF account activity takes place between Jul. 1, 2000 and Jul. 31, 2000, THEN perform management service D.
   management service D—send a request to account provider's server to block future transactions until user contacts the account provider themselves.

Transactions associated with Rule 6 may be withdrawals, deposits, transfer of funds, debit credit, purchases or sales of securities, any other form of transactions associated with the type of financial account the user is monitoring.

Automatic payment services may be set up by the user to prevent the user from paying penalty fees based on missed payments, over the limit balances and account balances that fall below minimum balance requirements. Management services of this type allow users to designate selected financial accounts that trusted intermediary server 110 may manage the withdrawal of funds from in order to credit an account that is in danger for being flagged for a penalty fee. Trusted intermediary server 110 may perform the payment by acting as a cybercash agent and send cybercash payment transactions to the account provider's server, via provider interface 260. Trusted intermediary server 110 may also act as an intermediary payment agent and authorize a service provider server to send a payment to another service provider server over network 115. Management services of this sort may be defined in a rule (Rule 7) similar to Rule 2, such as:

Rule 7:
IF the current date is within Y days of the due date of account AB's bill payment, AND no payment has been sent within Z days, THEN perform management service E.
   management service E—Withdraw needed funds from predefined account XY, and send withdrawn needed funds to account AB's provider's server to credit account AB.

In the above example, token information for account XY would be stored in user table 330 to perform an authorized transaction with a provider server associated with account XY.

As can be seen, trusted intermediary server 110 may be set up to automatically send payments for user accounts that are in danger of being assessed a penalty fee. In an alternate embodiment of the present invention, the set up procedure for the rules may query a user for selections on the type of penalties the user wishes to avoid, such as late payment fees or over the balance limit fees. The set up process may present the user with rules and service options associated with the penalties the user's selected to avoid. In another embodiment of the invention, trusted intermediate server 110 receives payment confirmation messages from the provider servers, and forwards the messages to the client node where the user is located. The confirmation message may be sent to the client node via electronic mail, pager messaging, automated voice messaging or any other type of messaging service that would enable server 110 to communicate with the user.

Trusted intermediary server 110 may manage automatic payment transactions in a variety of manners. In one embodiment of the invention, a user utilizing a cybercash account, may select to make cybercash payments using service provider servers that are cybercash agents. In this embodiment, a user may select a cybercash agent/account as the credit source for payments to other selected service provider servers. Upon detecting a trigger condition indicating automatic payment services to be rendered, trusted intermediary server 110 would then initiate a request to the cybercash agent to direct a payment to a service provider designated in the request from server 110. The cybercash agent would subtract the appropriate amount of available cybercash from the user's account at the agent. The cybercash agent would then direct a monetary payment to the designated service provider, over network 115. This payment may in the form of electronic payment operations known in the art. Alternatively, trusted intermediary server 110 may act as a cybercash agent itself, and direct payments to designated service providers directly over network 115.

In another embodiment of the invention, the trusted intermediary server may manage credit card clearing house (CCCH) requests to CCCH agents connected to network 115. Service provider servers 130, 132, 134 and 136 may represent such agents. In this embodiment, trusted intermediary server 110 may authorize credit card transactions from credit card service provider agents after a CCCH request validated such transactions.

As described, a variety of rules, trigger conditions and management services may be programmed into trusted intermediary server 110, for providing users with a number of customized management options for each of the users' accounts. Furthermore, trusted intermediary server 110 may perform a plurality of different roles when processing automatic payments for users, including, but not limited to, cybercash agent, proxy payment intermediary, CCCH requestor or validator and payment "traffic-cop" that directs the flow of electronic payment transactions between service provider servers 130, 132, 134 and 136.

Returning to FIG. 5, at step 510, once trusted intermediary server 110 has received all of the necessary token data and trigger set up information from the user, a user table 330 is created and stored in list 320. The user is now considered registered and the user's identification 310 is added to the registered user list 300.

Along with the token data 402, 404, 406 and 408, user table 330 may also include trigger rule codes 410 associated with each account, as illustrated in FIG. 4. Trigger rule codes, or flags, are identifiers that processor 220 reads when reviewing the user table 330 to determine whether a trigger rule is enabled for each account. This provides a quick reference for processor 220 to determine whether a rule is defined for a particular account, and whether trigger conditions need to be checked.

Registered User Operations

At step 512, the user is given the option to proceed with account management services or to end communications with trusted intermediary server 110, as represented at step 544. If the newly registered user selects to continue with account management functions (step 512; Yes), or the user requesting access to trusted intermediary 110 is already a registered user (step 504; Yes), processing proceeds to step 514. At step 514, the user table 330 for the registered user stored in user account data store 240 is accessed and sent to local memory 250. A last user flag is set at step 516, and processing proceeds to step 526, described later.

Upon determination (step 502; No), that there was no user request received at trusted intermediary server 110 (step 502; No), processor 220 checks for an update period at step 510. This period may be a customized time cycle which is checked to determine whether it is time to perform update operations on the data stored in the user account update table (not shown). This process ensures that the information processed by the trusted intermediary server 110 is current, as well enables server 110 to perform automated account monitoring functions without the need for user intervention. If it is determined that it is not time for an update (step 518; No), processing proceeds back to start 500. However, in the event trusted intermediary server 110 determines that it is time for an update (step 518; Yes), processing proceeds to step 520. At step 520, the user table 330 for the first registered user 310 stored in list 300 is accessed and stored in local memory 250. Local memory 250 may be a quick access type memory, such as cache or other form of RAM that enables data accesses to take place much quicker than slower magnetic types of memory that may be used for data stores 230 and 240. At step 522, processor 220 then determines whether the accessed user table 330 is associated with the last registered user in list 300, and if so (step 522; Yes), a last user flag is set to indicate this at step 540. Thereafter, processing proceeds to step 526. However, if processor 220 determines that the accessed user table is not associated with the last registered user in list 300 (Step 522; No), processing then proceeds directly to step 526, without a flag being set.

At step 526, the user table 330 stored in local memory 250 is accessed, and the first entry in the user table is read and analyzed. The token data for the read entry is placed in a message packet for transmission to the service provider's server associated with the account provider field 402, designated in user table 330. For example, if the first entry in user table 330 correlates to Capital One, (as illustrated in FIG. 4), the server governed by Capital One would be identified as the target server for communication by processor 220. Processor 220 determines whether the entry just read is the last entry in user table 330, and if it is (step 528; Yes), a last entry flag is set indicating this at step 530. Processing then proceeds to step 532. If processor 220 determines that the entry read is not the last entry in user table 330 (step 528; No), processing proceeds directly to step 532.

At step 532, the message packet with the appropriate token privileged data is sent to the target provider server, via service provider interface 260. The protocol performed between each provider's server and the trusted intermediary server 110 will vary based on the type of security and authentication process the provider's server operates with. Trusted intermediary server 110, having all of the privileged token data needed for account access, automatically communicates with the target provider's server, and issues the required security information needed to gain access to the user's account information. For example, some service provider servers may require user identification and first level password data, while other provider servers may require in depth account information and password data. Trusted intermediary server 110 recognizes each server's security protocol, and transmits the required information based on queries provided by the provider's servers.

For example, the trusted intermediary server 110 may have pre-established access agreements with the service provider servers. Accordingly, when a user sets up a user database, the trusted intermediary server 110 may provide the user with a list of providers that the trusted intermediary server 110 has an established access protocol agreement with. In one embodiment of the invention, the trusted intermediary server 110 may establish access protocols with service providers that are designated by a user during registration. In short, the trusted intermediary server 110 may access any service provider server that a user has access to, because the trusted intermediary server 110 acts as a proxy agent on behalf of the user.

Once access has been obtained, trusted intermediary server 110 retrieves account information for the entry read from user table 330. Trusted intermediary server may then close communications with the provider's server, or in an alternate embodiment of the invention, keep a running connection with the provider's server, until all processing is completed for the entry. The retrieved account information is stored in local memory 250, and user update table (not shown), stored in user account data store 240, is updated with current account information. Processor 220 analyzes the account information stored in local memory 250 against the information stored in user table 330, also stored in local memory 250. Processor 220 determines whether a trigger condition rule flag is set for the current entry, and if so, the trigger rule code associated with the entry is decoded. The trigger condition rule flag may be assigned the most significant or least significant bit of the trigger rule code 410. Processor 220 checks the designated bit to see if it is set indicating that a trigger condition rule is assigned to the current entry. The trigger rule flag 410 stored in user table 330 is provided in a code format that represents the type of rule assigned to the current entry read from user table 330. The flag/code 410 may vary for each user account in user table 330. For example, the flag/code defined for the E*Trade account (as illustrated in FIG. 4), may reflect that no trigger or management service is to be performed. The type of code used by methods, systems and articles of manufacture consistent with the present invention may vary without affecting the present invention's ability to associate rules with the entries stored in table 330.

Once decoded by processor 220, the trigger rule code represents a rule to be analyzed with the stored account information to determine whether a trigger condition is met for the account in the current entry, as shown in step 534. For example, if Rule 3 described above, was assigned to the current entry, and the stored account information reflected that the current balance of the user's account was within $200 of the balance limit, a trigger condition would be met. Upon the determination that a trigger condition was met, processing proceeds to step 536, where the designated management service associated with the rule is performed by trusted intermediary 110. In the above example, Rule 3 has management service A associated with the trigger condition, thus an electronic mail message reflecting the status of the account in the current entry would be generated and sent to the user. After management service(s) have been executed, processing proceeds to step 538.

In the event that no trigger condition flag is assigned to an entry (step 534; No), such as the E*Trade entry in user table 330, (as illustrated in FIG. 4), processing proceeds to step 538 with no services performed by trusted intermediary server 110.

At step 538, processor 220 checks the last entry flag to determine whether it is set, indicating that no more entries need to be processed in the user table 330. If processor determines that the last entry flag was not set (step 538; No), processing proceeds to step 539 where the next entry in user table 330 is designated, and that entry is subsequently accessed, as shown in step 526. If processor 220 determines that the last entry flag was set (step 538; No), the last user flag is checked to determine whether it has been set, as shown in step 540. If processor 220 determines that the last user flag has been set (step 540; Yes), trusted intermediary server 110 has completed its management functions for each account in user table 330 for each designated registered user, and processing ends at step 544. However, if the last user flag has not been set (step 540; No), processing proceeds to step 542, where the next user table 330 associated with the next user in list 300 is accessed and stored in memory 250, and processing continues at step 522.

Although not shown in the exemplary flow chart of FIG. 5, registered users may select to edit rules and account token data at anytime with trusted intermediary server 110. This allows users to dynamically adjust the type of account management without having to re-register.

As explained, methods and systems consistent with the present invention permit a trusted intermediary server 110 to perform account management functions for registered users by accessing the provider's server associated with each registered account, retrieving account information from the provider's server, analyzing the account information against designated user management preferences, and perform management services based on the preferences. Thus, registered users may define rules associated with selected accounts to ensure, for example, that no penalty fees are assessed to their accounts, as well as keep track of the status of these accounts without having to query the provider's servers themselves.

In another embodiment of the invention, trusted intermediary server 110 may be used as not only as an agent for ensuring automatic payments are made for other accounts, but as a purchasing agent as well. That is, the financial transactions managed by trusted intermediary server 110 may be implemented to purchase goods and services on behalf of the user as well. For example, a user may implement rules and trigger conditions to empower trusted intermediary server 110 to purchase stocks through an on-line broker agent/server. Users may also program rules to purchases goods from service providers based on the sales price for the goods. That is, users may use trusted intermediary server 110 to monitor the sales prices of selected products, and to purchase the products when a predetermined sales prices is provided.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, in an alternate embodiment of the invention, the operations performed by processor 220 may be replaced with dedicated processors that perform selected tasks associated with the operations of trusted intermediary server 110. The dedicated processors may include a service processor for performing only management service operations. Such a service processor may be further replaced with dedicated sub-processors for performing selected services, such as messaging, authentication, and electronic payment services.

Additional modifications and variations of the invention may be, for example, the described implementation includes software but the present invention may be implemented as a combination of hardware and software or in hardware alone. For example, the invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

The scope of the invention is defined by the claims and their equivalents.

What is claimed is:

1. A method for managing service accounts of users, comprising the steps of:
   receiving electronically from a customer user, information regarding at least one user service account associated with the customer user, the at least one user service account associated with at least one service provider;
   processing rules and service data to collect a predefined set of rules and services;
   transmitting, from a computer to the customer user, at least one customizable rule describing a trigger condition and at least one associated account management service, wherein the trigger condition is based on the predefined rules and services and is directed to a characteristic of the user service account maintained by the service provider, and the at least one account management service operable to be performed by the computer in response to a detection of the trigger condition;

receiving electronically from the customer user, at the computer, at least one user-customized rule describing a trigger condition and the associated at least one account management service defined by the customer user in response to the at least one customizable rule, wherein the rule is further customized to activate at a time specified by the customer user in the at least user-customized rule, the time beginning at a fixed starting time and wherein the at least one account management service comprises sending a message to the customer user, wherein the message includes information corresponding to the user service account information associated with the service provider;

providing in an electronic user service account data store, a user service account data table including user token data for the user service account;

accessing the user service account data table in the electronic user service account data store;

retrieving user service account information electronically from the service provider using the user token data;

determining, based on the electronically retrieved user service account information, whether the trigger condition associated with the retrieved user service account information is detected; and using the computer, performing the at least one account management service in response to the trigger condition being detected.

2. The method of claim 1, wherein the message is one of an electronic mail message, a pager message or an automated voice mail message.

3. The method of claim 1, wherein the service provider is associated with one of a financial institution, an service utility provider, a television entertainment provider, a telephone utility provider and an on-line trading service provider.

4. The method of claim 1, wherein the at least one account management service further comprises automatically crediting the user service account associated with the service provider.

5. The method of claim 4, wherein the crediting step includes:
sending a payment to the service provider;
receiving a confirmation message of said payment; and
forwarding the confirmation message to the user.

6. The method of claim 5, wherein the forwarding step includes sending at least one of an electronic mail message, a pager message and an automated voice mail message.

7. The method of claim 5, wherein sending a payment to the service provider includes:
sending a payment request to a second service provider; and
sending the payment from the second service provider to the service provider in response to the payment request.

8. The method of claim 1, wherein the providing step includes: receiving token data from the customer user, wherein the token data includes privileged data for the user service account associated with the service provider.

9. The method of claim 8, wherein the privileged data includes at least one of user ID, password data and account number information, for the user service account associated with the service provider.

10. The method of claim 8, wherein the at least one customizable rule describing a trigger includes a selectable trigger condition corresponding to the user service account associated with the service provider.

11. The method of claim 1, wherein the trigger condition includes at least one of detecting when a balance of the user service account is within a predetermined range of a threshold limit and detecting when a credit transaction to the user service account has not been performed in a predetermined time frame.

12. The method of claim 11, wherein the management service includes crediting a user service account with funds withdrawn from a default user service account.

13. The method of claim 8, wherein the user token data is encrypted, and the receiving step includes: decrypting the user token data received from the user.

14. A method for managing service accounts of users, comprising the steps of:
receiving electronically from a customer user, information regarding at least one user service account associated with the customer user, the at least one user service accounts associated with at least one service provider;
processing rules and service data to collect a predefined set of rules and services;
transmitting, from a computer to the customer user, at least one customizable rule describing a trigger condition and at least one associated account management service, wherein the trigger condition is based on the predefined rules and services and is directed to a characteristic of the user service account maintained by the service provider, and the at least one account management service operable to be performed by the computer in response to a detection of the trigger condition;
receiving electronically from the customer user, at the computer, at least one user-customized rule describing a trigger condition and the associated at least one account management service defined by the customer user in response to the transmitted at least one customizable rule, wherein the trigger condition is defined by a customer user and includes at least one of detecting when a balance of the user service account is within a predetermined range of a threshold limit and detecting when a credit transaction to the user service account has not been performed in a predetermined time frame, wherein the at least one user-customized rule is activated at a time specified by the customer user, the time beginning at a fixed starting time and wherein the at least one account management service comprises sending a message to the customer user, wherein the message includes information corresponding to the user service account information associated with the service provider;
providing in an electronic user service account data store, user token data for each user service account and user selected trigger setup data corresponding to the user service account associated with the service provider;
accessing the electronic user service account data store;
retrieving user service account information electronically from the service provider using the user token data;
determining, based on the electronically retrieved user service account information, whether the trigger condition associated with the retrieved user service account information is detected; and
using the computer, performing the at least one account management service in response to the trigger condition being detected.

15. The method of claim 14, wherein the service provider is associated with one of a financial institution, an service utility provider, a television entertainment provider, a telephone utility provider and an on-line trading service provider.

16. The method of claim 14, wherein the message is one of an electronic mail message, a pager message or an automated voice mail message.

17. The method of claim 14, wherein the at least one account management service further comprises automatically crediting the user service account associated with the service provider.

18. The method of claim 17, wherein the crediting step includes:
sending a payment to the service provider;
receiving a confirmation message of said payment; and
forwarding the confirmation message to the user.

19. The method of claim 18, wherein the forwarding step includes sending at least one of an electronic mail message, a pager message and an automated voice mail message.

20. The method of claim 18, wherein sending a payment to the service provider includes:
sending a payment request to a second service provider; and
sending the payment from the second service provider to the service provider in response to the payment request.

21. The method of claim 14, wherein the providing step includes: receiving token data from the customer user, wherein the token data includes privileged data for the user service account associated with the service provider.

22. The method of claim 21, wherein the privileged data includes at least one of user ID, password data and account number information, for the user service account associated with the service provider.

23. The method of claim 21, wherein the user token data is encrypted, and the receiving step includes:
decrypting the user token data received from the user.

24. The method of claim 17, wherein the crediting comprises crediting with funds withdrawn from a default user service account.

25. The method of claim 1, wherein the at least one account management service further comprises blocking at least one transaction that occurs after the fixed starting time on the user service account until permission to remove the block is received from the customer user.

26. The method of claim 14, wherein the at least one account management service further comprises blocking at least one transaction that occurs after the fixed starting time on the user service account until permission to remove the block is received from the customer user.

* * * * *